United States Patent
Kim et al.

[11] Patent Number: 5,311,338
[45] Date of Patent: May 10, 1994

[54] LIQUID CRYSTAL LIGHT VALVE WITH ANODIZED ALUMINUM LIGHT BLOCKING/REFLECTING LAYER

[75] Inventors: Dae-won Kim; Seok-bum Ma, both of Seoul, Rep. of Korea

[73] Assignee: SamSung Electronics Co., Ltd., Suwon, Rep. of Korea

[21] Appl. No.: 864,231

[22] Filed: Apr. 6, 1992

[30] Foreign Application Priority Data

Apr. 30, 1991 [KR] Rep. of Korea ............ 91-7150

[51] Int. Cl.$^5$ .............. G02F 1/135; G02F 1/1335
[52] U.S. Cl. ............... 359/70; 359/62; 359/67; 359/72
[58] Field of Search ............ 359/70, 71, 72, 74, 359/62, 69, 67; 205/323, 316, 118, 122, 222, 229

[56] References Cited

U.S. PATENT DOCUMENTS

| | | | |
|---|---|---|---|
| 3,832,034 | 8/1974 | Edmonds | 359/59 |
| 4,826,300 | 5/1989 | Efron et al. | 359/72 X |
| 4,881,110 | 11/1989 | Braatz et al. | 359/30 |
| 4,913,531 | 4/1990 | Efron et al. | 359/72 |
| 4,941,735 | 7/1990 | Moddel et al. | 359/67 X |
| 5,076,670 | 12/1991 | Sayyah | 359/72 |
| 5,081,542 | 1/1992 | Efron et al. | 359/41 |

FOREIGN PATENT DOCUMENTS 0040430 2/1987 Japan.

OTHER PUBLICATIONS

Anodic Oxide Films, L. Young, 1961, Academic Press.
Construction of Liquid Crystal Light Valve in Reflection Mode, Yoshikawa et al, Fujitsu Sci & Ted. Journal, vol. 12, No. 3, Sep. 1976.

Primary Examiner—William L. Sikes
Assistant Examiner—Kenneth Parker
Attorney, Agent, or Firm—Robert E. Bushnell

[57] ABSTRACT

A liquid crystal light valve and manufacturing method thereof is disclosed in which a light-reflecting layer and a light-intercepting layer are constituted by a single metal layer of aluminum with black matrices in a pattern for separating pixels and formed by anodization.

21 Claims, 2 Drawing Sheets

9a 1 2 3 4 5 6 7 8 7a 3a 2a 9b 10 30 70 70a 20a
90a 20 40 60a 80 30a 90a

LIQUID CRYSTAL LIGHT VALVE WITH ANODIZED ALUMINUM LIGHT BLOCKING/REFLECTING LAYER

BACKGROUND OF THE INVENTION

The present invention relates to a liquid crystal light valve (LCLV) used for a large-screen image projection apparatus and optical data processing apparatus and manufacturing method thereof, and more particularly to an LCLV with an improved layer structure having a reflecting layer.

Using the electro-optical characteristic of liquid crystal whose dynamic characteristic changes according to the presence or absence or the amount of incident writing light, an LCLV modulates projection light with the liquid crystal and is used to provide amplification light and to form an image and in the changing of its wavelength of the applied light. Such an LCLV is used for light reflection and transmission projection systems and optical data processors. Recently, the study of its application to household equipment has been proceeding.

FIG. 1 illustrates a conventional LCLV. In FIG. 1, transparent electrodes 3 and 3a to which a driving voltage is applied adhere to the inner surface of two parallel transparent substrates 2 and 2a. Liquid crystal LQ between transparent substrates 2 and 2a keep a certain distance between spacers 8 and 8a is in contact with orientation layers 7 and 7a. A sandwich layer composed of a photoconductor 4, a light interceptor 5 and a reflecting layer 6 is placed between electrode 3 of transparent substrate 2 which is on the side of incident writing light 9a, and the opposing orientation layer 7. In FIG. 1, reference numeral 1 denotes a filter while 9b denotes projection light.

In operation of the LCLV, a control voltage for dynamically controlling the liquid crystal which double-refracts projection light 9b forming an actual image must be switched by photoconductor 4 activated by writing light 9a having an image signal. Therefore, an LCLV should be designed so that when no writing light is incident, the impedance of a photoconductor is far greater than that of liquid crystal and when writing light is incident, the impedance of the photoconductor is far less than that of liquid crystal. However, the elements of the layer structure are physically joined, meaning that a deviation of the junction characteristic (for example, electrical contact resistance, that is, impedance) actually exists at each junction portion. Particularly, the junction characteristic of the elements of the layer structure is disadvantageous if each layer is thick. Since reflecting layer 6 is a multilayer consisting of dielectrics having high or low refractive indexes, it greatly affects the deterioration of the overall junction characteristic. Such a reflecting layer is usually stacked with more than ten layers of material made of $SiO_2$ and $TiO_2$ or $MgF_2$ and ZnS and has a high reflectance of about 95%. However, since the wavelength region in which complete reflection takes place is only plus or minus tens of nanometers from a specific reference wavelength according to the difference in reflectances of the two materials, complete reflection throughout the whole visible light spectrum can not be expected. To solve such a problem, the reflecting layer should be a stack of dielectrics having various reference wavelengths, eventually increasing the overall thickness of the layer. The increased thickness of layer results in raising the stress on the reflecting layer so that the junction characteristic of an adjacent layer, for example, the photoconductor or light intercepting layer, becomes poor, which in turn lowers product reliability and increases production costs.

As an improvement to the problem, an LCLV having an additional junction layer was disclosed in U.S. Pat. No. 4,799,773 which usually uses $SiO_2$ or CdTe as the junction layer. However, such an LCLV has a thicker photoconductor (over 30μm or so) for an impedance matching, which results in increase in production cost and reduction in productivity. In addition, since the reflecting portion of the reflecting layer is narrow, a filter (as an additional improvement) is required to be adhered to a light source.

SUMMARY OF THE INVENTION

Therefore, it is an object of the present invention to provide an LCLV which is inexpensive and easy to manufacture.

It is another object of the present invention to provide a most favorable method for manufacturing the LCLV.

To accomplish the objects, the liquid crystal light valve comprises a photoconductor the impedance of which is changed by writing light having an image signal, a double-refracting layer having liquid crystal which double-refracts incident projection light by a predetermined potential, a light-intercepting/reflecting layer interposed between the double-refracting layer and photoconductor, and electrodes for providing a driving voltage to the double-refracting layer, wherein the light-intercepting/reflecting layer is made of an aluminum thin layer and is oxidized in a pattern to form nonconductive black matrices and unoxidized conductive reflecting portions.

To accomplish the objects of the present invention, there is further provided a manufacturing method of a liquid crystal light valve comprising a photoconductor the impedance of which is changed by writing light having an image signal, a double-refracting layer having liquid crystal which double-refracts incident projection light by a predetermined potential, a lightintercepting-/reflecting layer interposed between the double-refracting layer and photoconductor, and electrodes for providing a driving voltage to the double-refracting layer, wherein a process for forming the lightintercepting-/reflecting layer comprises the sequential steps of stacking an aluminum thin layer on the photoconductor placed on one of the electrodes, forming a pattern screen having a shape corresponding to a pixel pattern on the aluminum thin layer, oxidizing portions unprotected by the pattern screen on the aluminum thin layer to form blackened pixel-separating matrices, eliminating the pattern screen from the aluminum thin layer, and abrading the blackened pixel-separating matrices that are projected from the surface of the aluminum thin layer during the oxidizing step, to create a uniform surface.

In the LCLV of the present invention, conventional light-intercepting and reflecting layers are formed by a single layer which is constructed so that its aluminum thin layer reflects projection light and its black matrices provided in a pattern on the aluminum thin layer absorb and intercept unnecessary light.

In the manufacturing method of the present invention, it is desirable that the aluminum thin layer be formed by a sputtering method with which excellent adhesion can be obtained and formation of the pattern screen on the surface of the aluminum thin layer be carried out by conventional photolithography. It is further desirable that, during the step of forming the black matrices, which blackens the exposed portions of the aluminum thin layer between the pattern screen, an anode oxidization method be used.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 1:
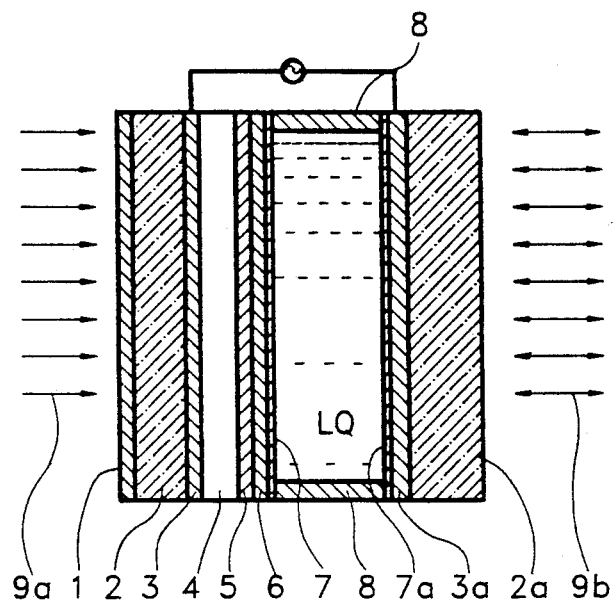
FIG. 1 shows a schematic cross-sectional view of a conventional LCLV.
Figure 2:
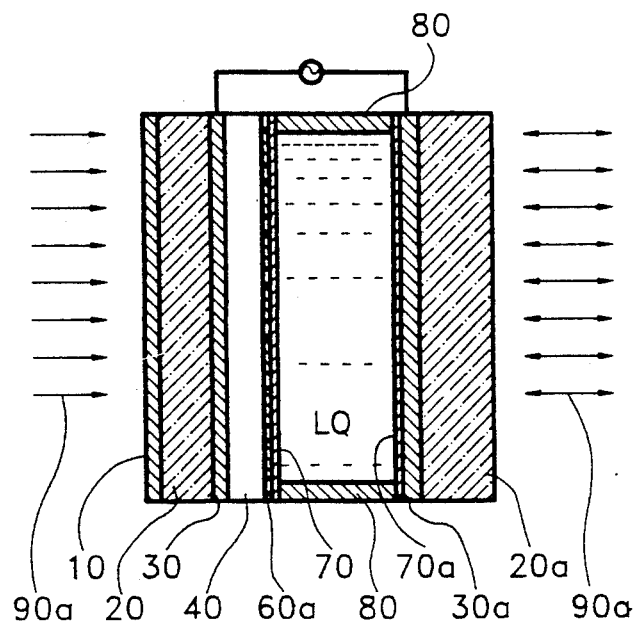
FIG. 2 shows a schematic cross-sectional view of an LCLV of the present invention.

Referring to FIG. 2, transparent electrodes 30 and 30a to which an AC driving voltage is applied are adhere on the inner surface of two parallel transparent substrates 20 and 20a. Liquid crystal LQ between transparent substrates 20 and 20a keep a certain distance with spacers 80 and 80a is in contact with orientation layers 70 and 70a. A sandwich layer composed of a photoconductor 40 and a light-intercepting/reflecting layer 60 for intercepting and reflecting projection light 90b is placed between electrode 30 of transparent substrate 20 located on the incident writing light side, and the opposing orientation layer 70. Here, the photoconductor is made of i-type amorphous silicon.

Figure 3:
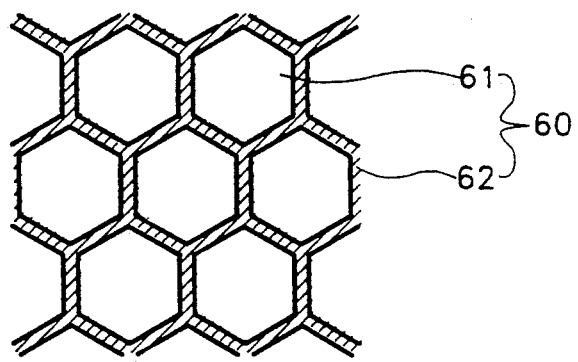
FIG. 3 shows an extracted front view of the reflecting layer of the LCLV according to the present invention shown in FIG. 2.

As the main feature of the present invention, light-intercepting/reflecting layer 60 is formed by processing aluminum via a sputtering or vacuum deposition method. As is shown in FIG. 3, light-intercepting/reflecting layer 60 comprises a conductive reflecting portion 61 and a nonconductive black matrix 62 which provide pixel separator means for enabling the absorption and interception of light. In the embodiment of the present invention, black matrix 62 is in the form of a honeycomb, but may be modified to a simple lattice structure, a complex combination of the two, or some other form. In FIG. 2, reference numeral 10 denotes a filter.

The LCLV of the present invention operates in the same way as a conventional LCLV. That is, when writing light 90a having an image signal is incident, the impedance of photoconductor 40 is changed according to the projected light of an image signal by a local luminance difference. This enables double refraction of the projection light by liquid crystal LQ while oriented in a certain direction and the projection light is re-reflected. The re-reflected projection light 90b reaches the screen to form an image.

Here, as the main feature of the present invention, light-intercepting/reflecting layer 60 reflects most of writing light 90a, with some being absorbed, thus changing the impedance of photoconductor 40. Since each reflecting portion 61 is conductive, it transmits the change of the impedance of photoconductor 40 to orientation layer 70. By encircling each reflecting portion 61 and being placed between photoconductor 40 and orientation layer 70, black matrix 62 always keeps its impedance so as to electrically isolate photoconductor 40 from orientation layer 70, and absorbs and disperse external light incident thereto. Black matrix 62 functions as a pixel separator. The double-refraction of projection light 90b by liquid crystal LQ occurs due to the change of impedance of photoconductor 40. The impedance change of liquid crystal LQ becomes distinctive due to conductive reflecting portion 61 and the nonconductive black matrix 62, so that a high-sharpness picture can be realized.

The LCLV of the present invention is characterized in its light-intercepting/reflecting layer wherein conventional light-intercepting layer and reflection layer are integrated into one. Further, the present invention is characterized in that a conventional bonding layer compensating for the junction between layers is eliminated. Features of the LCLV of this invention are as follows:

1) Since a dielectric of common inorganic material is not used as the reflecting layer material, the device is advantageous in the matching of the overall impedance and the reflecting layer's thickness is greatly reduced as compared with a conventional one;

2) In its manufacturing process, contrary to the conventional reflecting layer requiring a process of forming multiple thin layers, since only a process of forming a single metal layer (and the post-processing thereof) is required, productivity is improved due to manufacturing process reduction;

3) Since the reflecting portion is metal, it has a higher reflectance than the conventional one throughout the entire visible light spectrum to be suitable for color LCLVs;

4) The overall thickness of the layer structure is reduced so that the junction characteristic between surfaces of the interlayers is excellent and the concentration of its stress is relieved, to enhance the product's reliability;

5) Since neither a compensating filter nor specific conditions on the light source are required, the overall cost of the system is reduced;

From here on, a manufacturing method for the LCLV of the present invention will be described which in general follows the conventional manufacturing process. After the subsequent formation of an electrode and photoconductor on one substrate, the light-intercepting/reflecting layer, which is the main feature of the LCLV of the present invention, is formed.

Figure 4A:
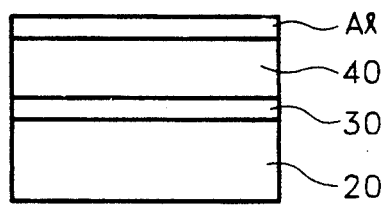
FIGS. 4A through 4E illustrate the process of manufacturing the LCLV according to the manufacturing method of the present invention.

First, in forming the light-intercepting/reflecting layer, as shown in FIG. 4A, an aluminum thin layer Al is formed on photoconductor 40 by vacuum deposition or a sputtering method.

Figure 4B:
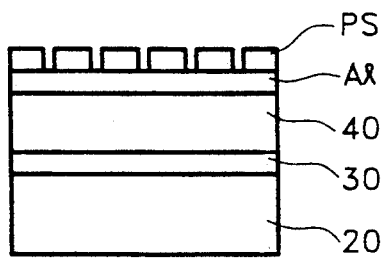

Then, as shown in FIG. 4B, a photosensitive resin layer is formed on aluminum thin layer A1 and is etched by photolithography to form a pattern screen PS having a form corresponding to a pixel pattern which is, for example, in the form of a honeycomb, a lattice structure, a complex combination of the two, or some other form.

Figure 4C:
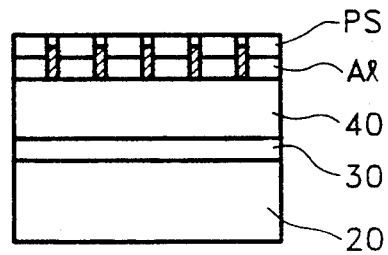

Subsequently, as shown in FIG. 4C, those portions of aluminum layer A1 which are unprotected by pattern screen PS, are oxidized to form a pixel-separating black matrix 62. Here, an anode oxidization method is desirably used under the conditions prescribed in the following <TABLE>.

<TABLE>

| | | |
|---|---|---|
| electrolyte composition (%) | oxalic acid | 2.5 |
| | sulfuric acid | 0.2 |
| | dissolved aluminum | 0.2 |
| voltage | 50–70 V | |
| current | 2A/dm | |
| temperature | 8–12° C. | |
| cathode | graphite | |

Since, in this method, the object of oxidization (the aluminum layer) is the anode, its power is applied through an electrode connected to the photoconductor. Here, to improve electrical conductivity, external light is radiated onto the photoconductor to lower its impedance. By doing so, the anode current stays steady and high to enable uniform and fast oxidization of the anode.

Figure 4D:
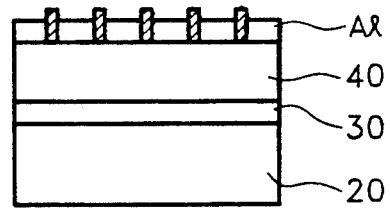
Figure 4E:
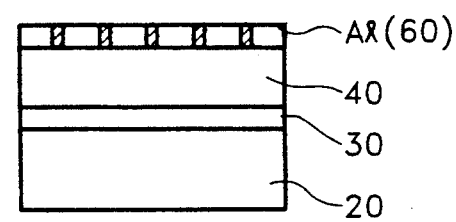

Due to such oxidization of the anode, as shown in FIG. 4D, the oxidized portions thereof become relatively thick. To prevent this, after pattern screen PS is eliminated by a corrosive, the oxidized portions are abraded to form one plane flush with the unblackened portions, as shown in FIG. 4E.

Through the above process, light-intercepting/reflecting layer 60 as the main feature of the present invention, is formed on photoconductor 40, and subsequent conventional process steps complete the LCLV of the present invention.

The manufacturing method of the present invention is most suitable in forming a light-intercepting/reflecting layer, especially an excellent black matrix.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A liquid crystal light valve, comprising:
   a photoconductor having an impedance varying upon impinging light representing an image signal;
   double-refracting layer means having a liquid crystal which double-refracts incident projection light by a predetermined potential, and orientation layers positioned on both sides of said liquid crystal;
   a light-intercepting/reflecting light interposed between said double-refracting layer means and photoconductor, said light intercepting/reflecting layer being in contact with said photoconductor and one of said orientation layers, wherein said light-intercepting/reflecting layer is made of an aluminum layer and is anode oxidized in a pattern to form nonconductive black matrices and unoxidized conductive reflecting portions; and
   electrodes for providing a driving voltage to said double-refracting layer means.

2. A liquid crystal light valve as claimed inc claim 1, wherein said nonconductive black matrices are in the form of a honeycomb, a lattice structure, or a combination of the two.

3. A liquid crystal light valve as claimed in claim 1, wherein said nonconductive black matrices are in the form of a honeycomb, a lattice structure, or a combination of the two.

4. A manufacturing method of a liquid crystal light valve comprising the steps of forming a photoconductor having an impedance varying upon impinging light representing an image signal, forming double-refracting layer means having a liquid crystal which double-refracts incident projection light by a predetermined potential, forming a light-intercepting/reflecting layer interposed between said double-refracting layer means and photoconductor, and forming electrodes for providing a driving voltage to said double-refracting layer means, wherein said step of forming said lightintercepting/reflecting layer comprises the sequential steps of:
   stacking an aluminum layer on said photoconductor placed above or on said electrodes;
   forming a pattern screen made of a photosensitive resin by photolithography, and having a shape corresponding to a pixel pattern on said aluminum layer;
   oxidizing portions exposed and unprotected by said pattern screen on said aluminum layer to form blackened pixel-separating matrices, thereby rendering the unprotected portions oxidized and projected from the surface of said aluminum layer;
   removing said pattern screen from the surface of said aluminum layer; and
   abrading the unprotected portions of said blackened pixel-separating matrices which are projected from the surface of said aluminum layer during said oxidizing step, to create a uniform surface.

5. A manufacturing method of a liquid crystal light valve as claimed in claim 4, wherein said pattern screen is made of a photosensitive resin and is formed by photolithography.

6. A manufacturing method of a liquid crystal light valve as claimed in claim 4, wherein said blackened pixel-separating matrices forming step is performed by an anode oxidization method.

7. A manufacturing method of a liquid crystal light valve as claimed in claim 5, wherein said black matrices forming step is performed by an anode oxidization method.

8. A manufacturing method of a liquid crystal light valve as claimed in claim 8, wherein, in said aluminum thin layer oxidizing step, external light is radiated onto said photoconductor.

9. A manufacturing method of a liquid crystal light valve as claimed in claim 7, wherein, in said aluminum thin layer oxidizing step, external light is radiated onto said photoconductor.

10. A liquid crystal light valve made by the process of claim 4.

11. A light valve, comprising:
    a transparent substrate;
    a first electrode disposed upon said transparent substrate;
    a photoconductor exhibiting an impedance changed by impinging light representing an image signal, positioned upon said first electrode;
    a single integrated first layer of an electrically conducting material formed upon a first surface of said photoconductor;
    a pattern of a plurality of discrete, spaced-apart pixels formed upon a first side of said first layer;
    anode oxidizing areas of said first side of said first layer disposed between said plurality of discrete, spaced-apart pixels to form a matrix between said pixels; and
    said first side of said first layer being treated to render said first layer of uniform thickness;
    mean for causing double refraction of said impinging light, separating from said photoconductor by said first layer; and a second electrode separated from said first layer by said means for causing double refraction.

12. The light valve of claim 11, further comprised of forming said first layer by sputtering said material upon said first surface of said photoconductor.

13. The light valve of claim 11, further comprised of means for orienting said impinging light, separating said means for causing said double refraction from said first layer and said second electrode.

14. The light valve of claim 11, further comprised of said matrix comprising an electrical isolator.

15. A light valve, comprising:
a transparent substrate;
a first electrode disposed upon said substrate;
a photoconductor exhibiting an impedance changed by impinging light representing an image signal, positioned upon said first electrode;
a single integrated first layer of aluminum formed upon a first surface of said photoconductor;
a pattern of a plurality of discrete, spaced-apart means for reflecting light formed upon a first side of said first layer;
a matrix formed by anode oxidation between said plurality of discrete, spaced-apart light reflecting means, said matrix for absorbing said impinging light; and
said first side of said first layer being treated to render said first layer of uniform thickness;
means for causing double refraction of said impinging light, separated from said photoconductor by said first layer; and
a second electrode separated from said first layer by said means for causing double refraction.

16. The light valve of claim 15, further comprised of said first layer being formed by sputtering said material upon said first surface of said photoconductor.

17. The light valve of claim 15, further comprised of said matrix comprising an electrical isolator.

18. The light valve of claim 15, further comprised of means for orienting said impinging light, separating said means for causing said double refraction from said first layer and said second electrode.

19. A method for fabricating a light-intercepting/reflecting layer of a liquid crystal light valve, comprising the steps of:
depositing a transparent electrode layer on the surface of a substrate;
depositing a photoconductor layer on said transparent electrode layer;
depositing an aluminum layer directly on said photoconductor layer;
forming a photosensitive resin layer on said aluminum layer, and etching said photosensitive resin layer away from said aluminum layer by photolithography in a pattern screen having a shape corresponding to a pixel pattern on said aluminum layer, thereby exposing said aluminum layer in accordance with said pattern screen and leaving unexposed portions of said aluminum layer for intercepting light of the light-intercepting/reflecting layer; and
oxidizing only the exposed aluminum layer in accordance with said pattern screen to form pixel-separating black matrices for reflecting light of said light-intercepting/reflecting layer.

20. A method for fabricating a light-intercepting/reflecting layer as claimed in claim 19, wherein the shape corresponding to the pixel pattern is a honeycomb shape.

21. A method for fabricating a light-intercepting/reflecting layer as claimed in claim 19, wherein the oxidizing step is performed by an anode oxidization method.

* * * * *

UNITED STATES PATENT AND TRADEMARK OFFICE
CERTIFICATE OF CORRECTION

PATENT NO. : 5,311,338
DATED : 10 May 1994
INVENTOR(S) : Dae-Won KIM and Seok-Bum MA It is certified that error appears in the above-indentified patent and that said Letters Patent is hereby corrected as shown below:

Column 1, line 18, after "image" insert --,--, line 28, after "8a", insert --,--.

Column 2, line 46, change "lightintercepting" to --light-intercepting--.

Column 3, line 60, change "and" to --so that--.

Column 5, line 21, after "as", insert --is--.

Column 5, claim 1, line 44, change "light" (second occurrence) to --layer--.

Column 6, claim 4, line 5, change "lightintercep" to --light-intecep--, claim 11, line 67, change "separating" to --separated--.

Signed and Sealed this

Fourth Day of July, 1995

*Attest:*

BRUCE LEHMAN

*Attesting Officer*     *Commissioner of Patents and Trademarks*